UNITED STATES PATENT OFFICE.

JOHN MATTHEWS, OF NEW YORK, N. Y.

IMPROVEMENT IN THE MANUFACTURE OF CIDER AND OTHER BEVERAGES.

Specification forming part of Letters Patent No. 172,139, dated January 11, 1876; application filed December 14, 1875.

*To all whom it may concern:*

Be it known that I, JOHN MATTHEWS, of New York, in the county of New York and State of New York, have invented certain new and useful Improvements in the Manufacture of Cider and other Beverages; and I do hereby declare that the following is a full, clear, and exact description thereof, which will enable others skilled in the art to which it pertains to make and use the same.

The beverages known under the names of cider, perry, crab-apple cider, and the like, are now made by fermenting the juice of apples, pears, and similar fruits, either freshly expressed, or the juice is expressed, concentrated by evaporation, and afterward diluted and fermented. To make sparkling beverages of these kinds the fermented juices are sometimes charged with carbonic-acid gas by the soda-water apparatus. To make a larger amount of the beverage, sugar and sirups are sometimes added, and organic acids, such as citric and tartaric acid. The natural sugar of the fruit serves only the purpose of producing alcohol and carbonic acid. There is also some citric acid in the fruit, which gives a pleasant acid taste; but with these products of the fruit there is always present in apples, pears, and similar fruits, a considerable quantity of malic and other organic acids, which give a harsh and unpleasant taste to the beverages produced. These are partially neutralized by the flavoring materials added; but so far it has not been possible to produce a cider or perry having the peculiar pleasant bouquet of the apple and pear without having also the harsh taste of the malic acid. This is accomplished by my invention, which consists in producing a composition which can be put up in bottles or other suitable vessels, and when diluted with water and charged with carbonic acid in the ordinary way will produce a pleasant sparkling beverage, resembling cider, perry, or other aromatic fruit cider, and free from any harsh or other unpleasant taste. In all essential materials the beverage produced is substantially the same as that which it imitates, and for which it is a substitute, free from objectionable features, and in a form in which it can be readily used.

The following description will enable others to make and use the invention.

For sparkling cider I take about one pound of tartaric acid and dissolve in one quart of warm water. I add four ounces of gum-arabic or clarified gelatine and two drams of what is known in commerce as oil of apple, or apple ether, or essence of apple, which is an ether belonging to the amyl series. This essence or ether is previously dissolved in four ounces of deodorized alcohol. I also add about one pound of sugar to the entire solution. This composition is bottled and corked for use. This new compound I call the "fruit extract."

To make the beverage I take twenty-four gallons of water, more or less, as may be desired for a stronger or lighter beverage, and add to it the quantity named above of "fruit extract" and twenty pounds of sugar. This I pour into a suitable receiver and charge it with carbonic acid. I allow it to stand for about two hours before use, so as to give it time to mellow and for the gas to be thoroughly combined with the other materials. It may then be served from the receiver or filled into bottles by any of the ordinary methods.

Instead of tartaric acid, citric acid may be used in the above formula, or these two may be combined. In fact, any pleasant-tasted innocuous acid may be used, such as phosphoric acid.

Instead of essence of apple, as above given for cider, essence of pear, essence of banana, essence of pine-apple or other like ether may be used to produce the beverage, having the corresponding flavor and boquet.

Any suitable innocuous coloring material may be added if desired.

Having thus described my invention, what I claim, and desire to secure by Letters Patent, is—

1. The improved combination herein described for producing cider and other beverages called "fruit extract," the same consisting of tartaric, or equivalent acid, gum-arabic, or equivalent mucilage, alcohol, sugar, and a fruity ether, the whole combined and put up for use substantially as set forth.

2. The improved beverage herein described, consisting of "fruit extract," water, and carbonic-acid gas, substantially as set forth.

JOHN MATTHEWS.

Witnesses:
VICTOR BAROTHY,
ERASTUS D. DUNCAN.